June 11, 1963  H. D. BOGGS  3,093,160
PLASTIC ARTICLES

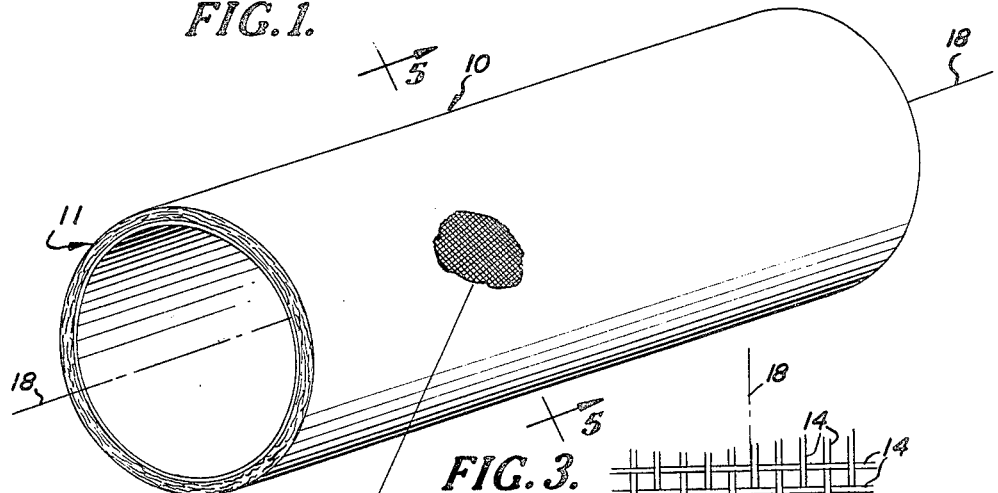
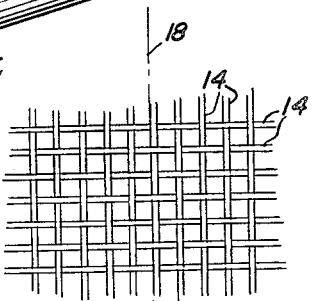
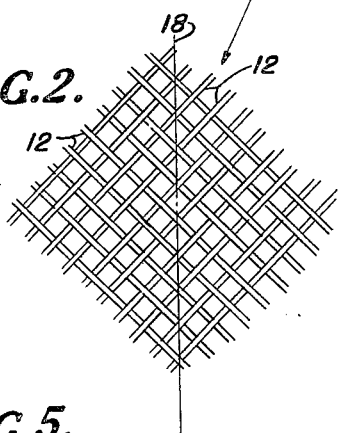
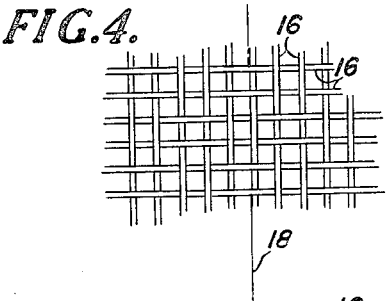
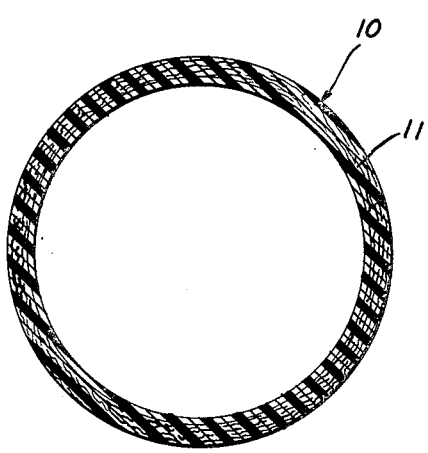
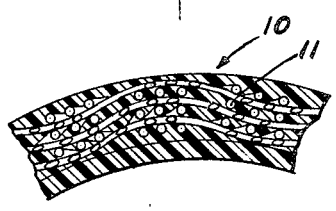

Original Filed Sept. 29, 1954  2 Sheets-Sheet 2

.004 MESH BETWEEN THREADS 60° HELIX

.0037 MESH BETWEEN THREADS 60° HELIX

.0272 MESH BETWEEN THREADS 60° HELIX

.001 MESH BETWEEN THREADS 70° HELIX

INVENTOR
HERBERT D. BOGGS
BY Cushman, Darby & Cushman
ATTORNEYS

United States Patent Office 3,093,160
Patented June 11, 1963

3,093,160
PLASTIC ARTICLES
Herbert D. Boggs, Tulsa, Okla., assignor, by mesne assignments, to H. D. Boggs Company, Ltd., Omaha, Nebr., a limited partnership
Continuation of abandoned application Ser. No. 459,092, Sept. 29, 1954. This application Dec. 4, 1959, Ser. No. 857,469
2 Claims. (Cl. 138—140)

This invention relates to fibrously reinforced elongated plastic articles including hollow elongated pressure conduits, such as piping.

The production of fibrously reinforced plastic piping is currently undergoing a great expansion, with the rate of production increasing as new applications for such plastic pipings are found. It has become increasingly apparent that the only limiting factor on the expansion of the industry is in the capacity of such piping to withstand large and sustained hydraulic, or other, pressures. As the thermosetting resinous materials usually used in the fabrication of plastic piping have relatively low shearing and tension failure coefficients, any increases in the pressural capacities of such piping must be derived from the strengthening of the cage formed by the fibrous reinforcement material and of the bond between the plastic and this material.

It has previously been proposed to form the fibrous reinforcement from a mat of glass fibers which is wrapped about a mandrel, or other object, to form a cylindrical tube. It has been further proposed to form such a tube by helically winding a strip of such matting material about a mandrel. These mats have been formed of randomly oriented fibers, or, on some occasions, have been formed of fibers which are pre-oriented to particular directions to give special shrinkage and setting reactions.

The use of inorganic fibrous reinforcement materials, such as glass, has created an entirely new technology, as frequently the difference between success and failure depends upon the recognition of several fine tolerances and the understanding of the correct use of many variable characteristics of the materials being utilized. From a strength viewpoint, it is desirable to have a large ratio, by weight, of glass to plastic, yet obviously, such a formula has practical limits inasmuch as there must always be sufficient plastic material present to form a proper bond between all the filaments of the reinforcing element. Also, an increase in the proportion of glass will, generally speaking, tend to increase the overall strength of the cage and will thereby act to increase the burst strength of the finished pipe. As a matter of practical experience, it has been determined that the maximum glass to plastic ratio is between 45% and 60% by weight.

The amount of space between the individual reinforcement fibers affects the volume of the mass of the resinous material in a pipe of given general dimensions, and therefore directly affects the total amount of the casting shrinkage. It has been considered important that the total amount of the shrinkage be held to rather small limits as the shrinkage of such resinous material results in a stress being induced in the mechanical bond between the resinous material and individual fibers of the reinforcing element. This shrinkage is bound up in dozens of tiny volumes of resin between the filaments or fibers of the reinforcement and is transmitted to the mechanical bond between the plastic and the glass.

Shrinkage occurs when polymerization or thermosetting takes place. It reduces the cast resinous body and can be stated in percentage of reduction of the size of the body. If, through adhesion to the mold cavity, or to the fiber reinforcement, the shrink is retarded in one or more directions, pent-up stresses are cast into the resinous body which pre-load the bond to the mold cavity or to the fiber. Thus, failure in this composite material results from the additional stress that it takes to break the bond between the resinous mass and the glass fibers. Minute parting at the resin-to-glass fiber line results in pin hole leaks, which can finally result in bursting of the pipe when a randomly oriented fibrous reinforcement mat is used.

It, therefore, follows that the spacing between each of the individual fibers of the reinforcement structure should be as small as possible; in fact, it is within the contemplated idea that the fibers lay next to one another in a contacting or semi-contacting relationship. In an endeavor to place the fibers next to one another, or contacting one another, it is, of course, quite likely that some of the neighboring fibers will be pressed against one another, that is, with a negative clearance. While such a juxtapositioning is not necessarily undesirable, care must be taken that the fibrous elements are not compressed against one another too tightly. In such a case, the resin will be unable to flow between the elements and it is imperative that there be sufficient flow to wet and surround every fiber in the reinforcement element. That is to say, if the resin is unable to flow through the spaces between the fibers, dry conditions or spots will exist, and such imperfections leave openings through which leakage will ultimately occur. It will, therefore, be seen that the optimum spacing between the individual fibers will be controlled inter alia by the viscosity of the particular resinous material being used to form the liquid settable mass.

As it is within the contemplation of this invention to form a reinforcement element of interwoven glass fibers which have been gathered into bundles or threads, it will be seen that as the bundle sizes become larger, the area between the bundles becomes greater, thus increasing the volume of the mass of resinous material which, in turn, increases the total shrink. It is for this reason that the size of the bundles of filaments becomes one of the critical factors in the production of fibrously reinforced plastic piping which can sustain large and prolonged internal hydraulic stresses. It has also been found that greater pipe strengths are directly related to the maximum amount of glass that can be placed in the structure without undue compression of the fibrous material, causing an improper wetting.

Fiber arrangement, weave, braid or placement, as will be discussed hereinafter, are also related to this bundle and filament size factor. In view of the fact that some of the pin-hole leakage occurs through mesh openings in the fibrous material, particularly where the reinforcement is uniform in pattern, a random placement, that is, an out-of-line placement of the elements of the various layers of fibrous material will decrease the great pressure concentration in resin-rich areas and thus increases the overall capacity of fibrously reinforced plastic piping. Random mat has a broken layering within the mat thickness itself and thus the broken mesh openings are continued as one layer is placed over another. Cloth convolutely wrapped will, for the most part, result in a broken mash pattern from layer to layer, but this becomes less effective as the mesh openings become larger.

A good pattern or form of fibrous reinforcement must have certain other physical qualities if an optimum performance is to be attained. For example, the reinforcement material selected must have proper de-bulking characteristics, that is the fibrous element must lay flat and smooth within the mold, since folds and wrinkles hinder reinforcement, and weaken the structure to the tensile strength of the resin which, as stated above, is not great. While the burst strength of piping might be said to be the most important factor, it will be readily seen that pipes are often subjected to external forces and that a low structural strength diminishes the scope of utility of a particular pipe section. It is, therefore, highly desirable to provide a fibrous reinforcement pattern which can contribute substantially to the structural strength of the composite section formed therewith.

The fibrous reinforcement must also be formed in such a manner that the filaments, bundles or threads are not easily disturbed or moved from their predetermined locations during its placement within the molding apparatus, as any such movement will result in resin-rich areas which, as stated above, will often lead to a premature failure of the piping at a point well below its design pressure.

Being aware of all of these problems and variables discussed above, it is therefore an object of this invention to provide an improved fibrously reinforced plastic pressure conduit having an improved fibrous placement which gives a uniform high strength.

It is a further object of this invention to provide a fibrously reinforced plastic pressure conduit which has a higher strength and a lower production cost than such articles made under methods heretofore practiced.

It is a further object of this invention to provide a fibrously reinforced pipe having a reinforcement element which will de-bulk properly when placed within a casting mold.

It is another object of this invention to produce a pipe which can with uniformity and certainty be designed to meet specific requirements; for instance, if high hoop strength to resist burst is required, or if high longitudinal strength is required, the pipe can be made for these specific conditions.

It is yet another object of this invention to control the thread size and spacing of the reinforcement material in order to get uniform and thorough penetration of the sleeve by the plastic material.

It is still another object of this invention to produce a pipe in which the operating conditions of production are not as critical as in the plastic pipes heretofore produced.

It is still another object of this invention to provide fibrously reinforced plastic pipe having a reinforcement element which has one or more layers prefixed or stiffened to provide an arch strength therefor prior to being inserted within a casting mold.

These and other objects of this invention will be apparent from the consideration of the following description of a specific embodiment, shown for the purpose of illustration, in the accompanying drawings in which:

FIGURE 1 is a perspective view of a pressure conduit having a seamless tubular interwoven fibrous reinforcement element;

FIGURE 2 is a greatly enlarged plan view of a segment of the interwoven seamless reinforcement element;

FIGURE 3 is a greatly enlarged plan view of a modified segment of an interwoven seamless reinforcement element;

FIGURE 4 is a greatly enlarged plan view of another modified segment of an interwaven seamless reinforcement element;

FIGURE 5 is a section taken along line 5—5 of FIGURE 1;

FIGURE 6 is a greatly enlarged fragmentary view of the section illustrated in FIGURE 5;

Figure 13:
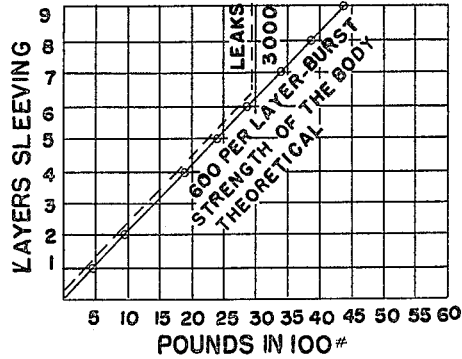
Figure 14:
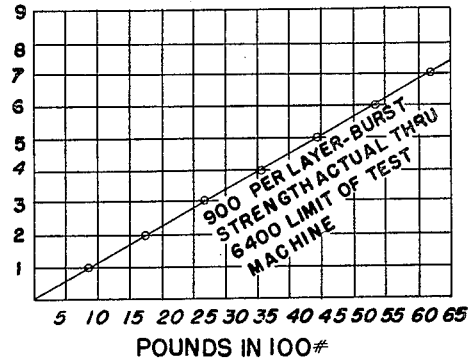

FIGURE 13 is a graphical representation of the relation between the number of layers of sleeving and the pressural capacity, in hundreds of pounds per square inch, and illustrates the point at which leakage will occur, when there is a .0037 inch mesh opening between threads, the threads being oriented in a 60° helix; and FIGURE 14 is a graphical representation of the relation between the number of layers of sleeving and the pressural capacity, in hundreds of pounds per square inch, when there is a .001 inch mesh opening between threads, the threads being oriented in a 70° helix.

In FIGURE 1, there is illustrated a seamless plastic pipe 10 having a tubular seamless interwoven sleeve embedded therein to form a reinforcement element. The pipe may be cast of any of a number of thermosetting resinous materials, such as polyester resins, epoxy resins or phenolic-epoxy resins. The interwoven sleeves 11 are made up of threads formed from filaments of glass fiber. Such filaments of glass fiber are commonly segregated together into bundles consisting of 204 filaments which are sometimes termed an "end" or a "strand." A thread is an end or a bundle of ends which have been twisted, therefore, for the purpose of this disclosure, the term "thread" will be applied to any segregated group of glass filaments, and no distinction will be made, except where indicated, between threads formed of twisted filaments, and threads formed of filaments lying straight in their natural state.

The interwoven pattern of the thread making up the tubular seamless reinforcement sleeves is illustrated in FIGURES 2, 3 and 4. The enlarged fragmentary segment illustrated in FIGURE 2 is a braid in which the stitches 12, which are made up of two or more threads, are passed over other stitches 12, made up of two or more threads. It will be seen that the threads, and therefore the stitches, are oriented at an angle with the longitudinal axis of the pipe, which is indicated by the center line 18.

In FIGURE 3, there is illustrated an enlarged fragmentary segment of a tubular seamless reinforcement sleeve which is formed with interwoven threads. That is, the threads pass over and under relatively transversely extending threads 14. It will be seen that the threads are oriented with, or are at right angles with, the longitudinal axis of the tube, here represented by the center line 18. That is to say, some of the threads extend longitudinally of the pipe and parallel to this axis, while the other threads extend peripherally of the tube, or at right angles to its longitudinal axis. In FIGURE 4, there is illustrated another interwoven pattern in which two threads 16, forming a stitch, extend over and under relatively transversely extending pairs of threads 16, which also form stitches. In some applications, this pattern of weaving is superior to that illustrated in FIGURE 3, inasmuch as less crimp is placed upon the individual threads.

For convenience, this application will refer to a reinforcement pattern as being braided when the stitches cross two or more relatively transversely extending stitches and extend obliquely relative to the longitudinal axis of the pipe, that is, when they form a helix about the axis of the pipe. All other patterns are hereinafter deemed to be woven, when the stitches or threads forming the mesh extend longitudinally of, and peripherally of, the pipe.

Figure 8:
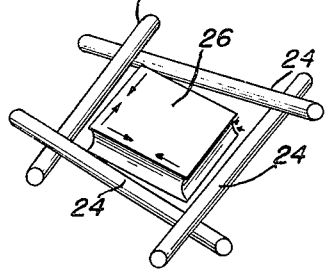
FIGURE 8 is an exemplary perspective view illustrating the relation between interwoven threads and the mass of resin disposed within the mesh opening of the threads.
Figure 7:
FIGURE 7 is an exemplary sectional view illustrating the relation of thread size to the resin area.

While the size of the threads or stitches, and hence of the composite section formed by braiding or weaving, is a matter of choice, some particular sizes of threads will form a superior tubular seamless sleeve for a particular size or O.D. pipe. As stated hereinabove, the smaller the sizes of the particular threads, the less space there will be between the various thread elements and thus a higher proportion, by weight, of glass to resin is possible. In FIGURE 7, there is an exemplary showing of the relation between thread size and the volume of the mass of plastic material 22 between the threads 20. In FIGURE 8, there is illustrated the relation of the interwoven threads 24 and the mass of resin 26 disposed within the mesh opening. It will be seen that when the thermosetting shrinkage occurs, the volumetric reduction in the mass of the resin places a stress upon the mechanical bond between the resin and the glass. It, therefore, follows that as the size of the threads and the mesh openings decrease, the total shrink, and hence the shrinkage stress, is reduced.

Glass filaments may be procured in various end sizes and are designated, for example, as 225, 150 or 75, which means that there are 22,500, 15,000, or 7,500 yards, respectively, of filament in a pound. As stated above, an end consists of 204 filaments segregated together. It is, therefore, evident that the end sizes take up their designation from the filament diameter. That is, for example, a 225 end size is made up of 204 filaments, each .00028 inch in diameter; a 150 end size is made of 204 filaments, each .00038 inch in diameter; and the 75 end size is made up of 204 filaments, each having a diameter of .00053 inch.

In one preferred embodiment of this invention, the threads have been formed from a 150 end size with 12 ends formed with 1 to 2 twists per inch of the thread. However, excellent results have also been obtained by using 10 ends formed with 4 to 9 twists per inch. Generally speaking, satisfactory results may be obtained with twists per inch varying from 1 to 8, with the filament size varying from 75 to 225. It has also been determined that an excellent reinforcement pattern may be formed using threads or strands which have not been twisted. In such a case, the strands are kept under an even tension when the interwoven pattern is being formed.

Referring more particularly to the formation of a seamless tubular reinforcement element with a braided pattern as illustrated in FIGURE 2, the threads 12 are oriented to form a helix angle with the longitudinal axis 18 of the tubular element. When this helix angle is relatively small, the pipe so reinforced will be strengthened to resist exterior longitudinal forces, whereas when the helix angle is increased, the resistance to radial forces, that is the hoop or burst strength of the pipe, will be increased. While satisfactory results may be obtained with any of a large number of helix angles, the embodiment illustrated in FIGURE 2 has its threads oriented at a helix angle of 45°.

In accordance with this invention, the seamless tubular sleeving is braided or woven on a mandrel using ends of a desirable filament size and with a suitable number of threads joined in the formation of the stitches. If two or more sleeves 11 are used, they are arranged concentrically, that is, one on top of or around the other, as best illustrated in FIGURES 5 and 6. It is preferable to spray the first or inner layer with a fixative material during or after the braiding or weaving so as to give it arch strength to hold up the other layers and also to facilitate the withdrawal of the mandrel from the sleeving element after the mandrel has served its purpose. In some cases, it has been found desirable to spray the fixative material on several of the inner layers or, in some cases, on all of the layers.

The successive braided sleeves may be formed with their threads oriented at varying helix angles ranging from 45° to 70°. For example, the innermost sleeve may be formed with a helix angle of 45° while the outermost sleeve has a helix angle of 70°. When multiple layers are used, each successive braided sleeve can have a progressively varying helix angle between that of the innermost and outermost sleeve. This result can be achieved by forming each of the successive sleeves or layers in a pattern having a different helix angle, with each of the sleeves having a different diameter. It is within the contemplation of this invention to form the various layers from threads having varying helix angles or numbers of twists per inch.

Figure 9:
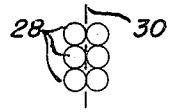
FIGURE 9 is an exemplary sectional view illustrating the relation of the threads of the superposed reinforcement layers.
Figure 10:
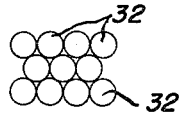
FIGURE 10 is another exemplary sectional view illustrating the preferred relation of the threads of the superposed reinforcement layers.

It is also within the contemplation of this invention that all of the sleeving be originally uniformly braided to the same sleeve diameter and then laid up, layer upon layer, upon the mandrel. When this is done, the inner layer will have the smallest helix angle because the drawing of the next layer over the first tends to increase the diameter of the second layer and thus distorts its weave in a manner which increases its helix angle. This result is very advantageous, as then the interstitches, if any, in the adjacent layers will not line up and thus the tendency of the resin to flow through too freely will be retarded. There will be a broken or heterogenous mesh pattern radially of the pipe and, therefore, there will be fewer, and smaller, resin-rich areas. As shown in FIGURE 9, if the threads 28 of the various layers are arranged in radial alignment, there will be a straight shear line 30 extending radially of the pipe. In FIGURE 10, there are illustrated threads 32 of the superposed layers arranged in a broken or heterogenous mesh pattern having a longer, stronger line of resistance. It will be seen that the arrangement illustrated in FIGURE 10 results in a smaller resin area which contributes to a reduction in shrinkage stress.

As the interwoven seamless tubular reinforcement elements have a certain stiffness, which may be increased by the addition or spraying of a fixative as discussed hereinabove, they will de-bulk properly when placed in the mold. That is, the elements will not wrinkle or fold creating bunches, folds, and resin-rich areas. The resin-rich area condition in a pipe results in certain stresses being taken up by the resin, and, hence, transferred to the resin-fiber bond. It is, of course, desirable that some of the stress be taken up by the cage formed by the glass fibers themselves, rather than by the mechanical bond between the resin and the fibers.

After an appropriate number of layers of sleeving have been braided on the mandrel, with the threads of the successive layers oriented at varying angles as discussed hereinabove, the sleevings are placed in a mold, the mandrel being used to thread the reinforcing sleeving thereinto. If the centrifugal casting method is practiced, as disclosed by my copending application, Serial No. 264,976, filed January 4, 1952, now Patent Number 2,785,442, the mandrel is withdrawn therefrom before a pipe is cast with a thermosetting resinous material. If pressure molding is to be used, as disclosed in my copending application, Serial No. 405,339, filed January 21, 1954, now Patent Number 3,037,244, the mandrel may be left in place until after the thermosetting resin has been cured, as by heat.

While it is desirable to have the threads of the reinforcing sleeving in direct contact with one another, they can be manufactured to give satisfactory results with a space between of .001 inch, or they may be crowded together with a negative tolerance of .001 inch. That is, the threads may be crowded together until the distance between their centers is less than the diameter of the threads in a relaxed position. When so crowded together, it is evident that the threads will be distorted out of round, but this apparently does not decrease the strength of the mechanical bond between the fiber and the resin.

It has been determined, however, that there is a direct relation between the size of the mesh opening between the threads and the pressure at which a plastic reinforced pipe will leak. As a practical matter, the maximum usable spacing between the threads is .001 inch.

Figure 12:
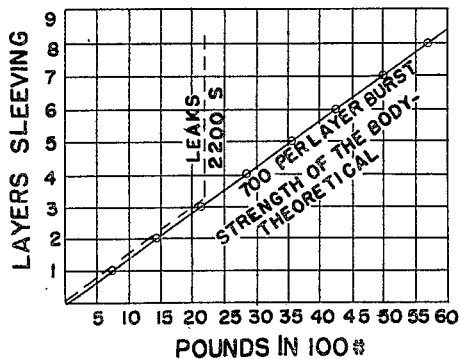
FIGURE 12 is a graphical representation of the relation between the number of layers of sleeving and the pressural capacity, in hundreds of pounds per square inch, and illustrates the point at which leakage will occur, when there is a .004 inch mesh opening between threads, the threads being oriented in a 60° helix.
Figure 11:
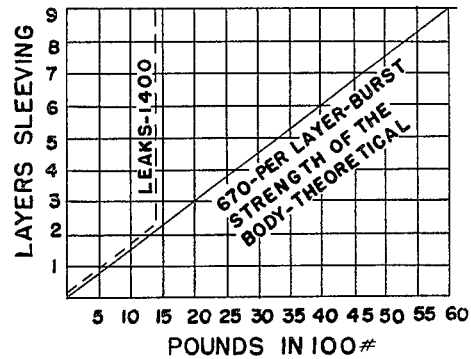
FIGURE 11 is a graphical representation of the relation between the number of layers of sleeving and the pressural capacity, in hundreds of pounds per square inch, and illustrates the point at which leakage will occur, when there is a .0272 inch mesh opening between threads, the threads being oriented in a 60° helix.

Referring more particularly to FIGURES 11, 12, 13 and 14, in which there are graphical representations of the relation between the numbers of layers of sleeving, and the pounds of pressural capacity, expressed in hundreds of pounds per square inch, the curve of the theoretical bursting strength is a straight line. In FIGURES 11, 12, and 13 the pressural point at which leakage occurs is indicated by a vertical broken line. A comparative examination of these figures clearly shows the relationship between the size of mesh opening, and the point at which the fibrously reinforced plastic pipe will fail, through leakage. As the size of the mesh opening is decreased, the leakage pressure, that is the pressure at which the pipe first gives indication of leaking, increases materially. As shown in FIGURE 14, when the mesh opening is reduced to .001 inch a balanced reinforcement body design is attained. That is to say, the pipe will not leak prior to bursting. The last mentioned figure illustrates the results of a test in which a reinforced plastic pipe having a mesh opening of .001 of an inch, and having the threads wound at a 70° helix angle, reached the 6400 pound per square inch limit of a testing machine without giving any indication of leakage. It will be seen that the theoretical burst point of the specimen used was 6300 pounds per square inch.

It is, therefore, clearly established that as the mesh opening size decreased, the pressure that a pipe will stand increases. It would seem that if the threads are compressed beyond the limit of the negative tolerance given hereinabove, that is, minus .001 inch, the flow of the resinous material will be impeded and there will result dry spots or improperly wetted areas which may eventually cause a failure of the structure when it is subjected to high pressures. When a braided sleeve is to be greatly distorted to increase its size or increase its helix angle, it may be necessary to form the element with an increased number of threads in order to keep the mesh at the desired spacing.

It is evident that this method may be practiced with any of a large number of liquid settable materials, including the thermosetting resins discussed hereinabove. It is proposed to use .05% to .125% cobalt as an accelerator. A peroxide catalyst, such as a product called D.D.M. sold by Wallace and Tiernan, and others, can be used interchangeably with heat, within limits. The catalyst speeds up the curing resin and the cobalt speeds up the catalytic action.

It is also feasible to use particular liquid settable materials to obtain certain physical characteristics in the finished pipe. For example, it has been found that a semi-flexible pipe may be formed by using a 40% flexible resinous material and a 60% rigid resinous material.

It should be clear that it is within the contemplation of this invention that pipes or tubular sections may be formed in shapes other than circular, for example, either elliptical or other shapes which it is possible to cast. The pipes need not be of uniform cross section, that is, they may be formed with one or more integral tapers.

Having described only typical preferred forms and applications of my invention, I do not wish to be limited or restricted to specific details herein set forth but wish to reserve to myself any variations of modifications that may appear to those skilled in the art and falling within the scope of the following claims.

This is a continuation of my co-pending application Serial No. 459,092 filed September 29, 1954, now abandoned.

What is claimed is:

1. A rigid reinforced pipe for sustaining high pressures comprising thermosetting resinous material selected from a class of polyester resins, epoxy resins and phenolic-epoxy resins and including a reinforcement element of a uniformly interwoven seamless sleeving formed of glass threads, said sleeving being entirely surrounded by a mass of said resinous material, the mesh opening in said sleeving being less than about .001 inch.

2. A rigid reinforced pipe for sustaining high pressures comprising thermosetting resinous material selected from a class of polyester resins, epoxy resins and phenolic-epoxy resins and including a reinforcement element comprising a plurality of layers of uniformly interwoven seamless sleeving formed of glass threads, said sleeving being entirely surrounded by a mass of said resinous material, the mesh opening in said sleeving being less than about .001 inch.

References Cited in the file of this patent

UNITED STATES PATENTS

| | | |
|---|---|---|
| 1,152,836 | Price | Sept. 7, 1915 |
| 1,520,191 | Mackey | Dec. 23, 1924 |
| 1,978,211 | Loughead | Oct. 23, 1934 |
| 2,009,075 | Thompson | July 23, 1935 |
| 2,594,693 | Smith | Apr. 29, 1952 |
| 2,594,838 | Alexander | Apr. 29, 1952 |
| 2,690,769 | Brown | Oct. 5, 1954 |
| 2,747,616 | De Ganahl | May 29, 1956 |
| 2,807,282 | Watts et al. | Sept. 24, 1957 |